United States Patent [19]

Fuller

[11] 4,049,784
[45] * Sept. 20, 1977

[54] PRODUCTION OF CHLORINE DIOXIDE WITH PRODUCT SLURRY METATHESIS

[75] Inventor: Willard A. Fuller, Grand Island, N.Y.

[73] Assignee: Hooker Chemicals & Plastics Corporation, Niagara Falls, N.Y.

[*] Notice: The portion of the term of this patent subsequent to Aug. 24, 1993, has been disclaimed.

[21] Appl. No.: 689,405

[22] Filed: May 24, 1976

Related U.S. Application Data

[63] Continuation-in-part of Ser. No. 556,379, March 7, 1975, Pat. No. 3,976,758.

[51] Int. Cl.$^2$ ............................................. C01B 11/02
[52] U.S. Cl. .................... 423/478; 423/480; 423/497; 423/499; 423/552; 423/554; 260/538
[58] Field of Search .............. 423/497, 499, 478, 551, 423/552, 554, 530, 500, 658.5, 659; 260/538; 23/270 R

[56] References Cited

U.S. PATENT DOCUMENTS

| 1,990,896 | 2/1935 | Connell | 423/552 |
| 2,531,137 | 11/1950 | Laubi et al. | 423/530 |
| 2,684,285 | 7/1954 | Dancy | 423/552 |
| 3,390,402 | 6/1968 | Georg | 23/270 R |
| 3,754,081 | 8/1973 | Partridge et al. | 423/478 |
| 3,793,439 | 2/1974 | Rapson | 423/478 |
| 3,976,758 | 8/1976 | Fuller | 423/478 |

FOREIGN PATENT DOCUMENTS

| 690,311 | 7/1964 | Canada | 423/552 |
| 624,695 | 1/1936 | Germany | 260/538 |

Primary Examiner—O. R. Vertiz
Assistant Examiner—Brian E. Hearn
Attorney, Agent, or Firm—Peter F. Casella; William J. Crossetta, Jr.

[57] ABSTRACT

An improved process for the production of chlorine dioxide wherein an alkali metal chlorate and a mineral acid are reacted in a single vessel, and the resultant alkali metal salt is converted to a more desirable salt in a metathesis column by reaction with an appropriate acid or an alkaline earth or alkali metal, chloride.

24 Claims, 3 Drawing Figures

PRODUCTION OF CHLORINE DIOXIDE WITH PRODUCT SLURRY METATHESIS

This application is a continuation-in-part of Ser. No. 556,379, filed Mar. 7, 1975 now U.S. Pat. No. 3,976,758, issued Aug. 24, 1976.

This invention relates to chlorine dioxide production. More particularly, this invention relates to improvements in a method for treating sulfate-containing slurries emanating from single vessel process chlorine dioxide generators.

Inasmuch as chlorine dioxide is of considerable commercial interest and importance in the areas of pulp bleaching, water purification, fat bleaching, removal of phenols from industrial wastes, textile bleaching and the like, it is very desirable to provide processes by which the chlorine dioxide can be economically produced and by which the type of effluents produced thereby can be controlled.

One of the means of producing chlorine dioxide is by the reaction of alkali metal chlorate, a chloride and mineral acid such as sulfuric acid and mixtures of sulfuric acid with phosphoric and/or hydrochloric acids. Such reactions as occur are exemplified by the following:

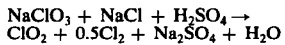
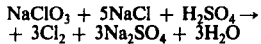

$$NaClO_3 + NaCl + H_2SO_4 \rightarrow ClO_2 + 0.5Cl_2 + Na_2SO_4 + H_2O \quad (1)$$

$$NaClO_3 + 5NaCl + H_2SO_4 \rightarrow + 3Cl_2 + 3Na_2SO_4 + 3H_2O \quad (2)$$

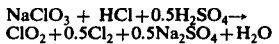
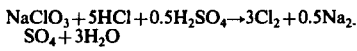

$$NaClO_3 + HCl + 0.5H_2SO_4 \rightarrow ClO_2 + 0.5Cl_2 + 0.5Na_2SO_4 + H_2O \quad (1A)$$

$$NaClO_3 + 5HCl + 0.5H_2SO_4 \rightarrow 3Cl_2 + 0.5Na_2SO_4 + 3H_2O \quad (2B)$$

Such reactions are employed commercially, with the reactants continuously fed into a reaction vessel and the chlorine and chlorine dioxide produced therein continuously removed from the reaction vessel.

Reactions (1) and (1A), which are favored inasmuch as they produce primarily chlorine dioxide, result from the use of about equimolar amounts of chlorate and chloride.

A single vessel process for producing chlorine dioxide is set forth in U.S. Pat. No. 3,563,702, the teachings of which are hereby incorporated by reference, wherein alkali metal chlorate, an alkali metal chloride and a mineral acid solution are continuously fed to a single vessel generator-evaporator-crystallizer in proportions sufficient to generate chlorine dioxide and chlorine, at a temperature of from about 50° to about 100° centigrade, and an acidity of from about 2 to higher than about 5 normal, in the presence of a catalyst, or at about 4–12 normal without catalyst, removing water by vacuum-induced evaporation at about 100–400 millimeters of mercury absolute, with concurrent withdrawal of chlorine dioxide and chlorine, crystallizing the salt of the mineral acid within the generator and withdrawing the crystals from the vessel.

As the reaction occurs within the generator, in reactions where sulfuric acid is employed as a mineral acid reactant, crystals of sodium sulfate and sodium acid sulfate in amounts and presence dependent generally upon the acid concentration used, are crystallized out and settle to the bottom of the generator from whence they are withdrawn in the form of a slurry.

In addition to the use of sulfuric acid, hydrochloric acid can also be used as the mineral acid reactant, in which instance the crystals removed from the generator are alkali metal chloride crystals. However, the hydrochloric acid process produces alkali metal chloride as a by-product, which product is often less desirable than alkali metal sulphate. Sodium sulphate is a valuable by-product, useful in kraft pulping operations, as is the chlorine dioxide. Therefore, systems producing chlorine dioxide and sodium sulfate are particularly useful inasmuch as on-site co-ordination can be effected with pulping operations, utilizing both the primary chlorine dioxide product and the recovered sodium sulfate in the pulping process, particularly in kraft mill operations.

In some instances, however, the requirement for sodium sulfate is greatly reduced or obviated. In certain types of pulping process, sodium sulfate is not required. In certain kraft mill operations, the requirements for sodium sulfate may be reduced or varied, and the disposal of excess salt produces problems, in view of environmental protection standards presently in force. While the requirement for reduced quantities of sodium sulfate may vary, the requirement for the chlorine dioxide remains.

In such instances where reduced quantities or no sodium sulfate is required, the single vessel process can be converted to utilize hydrochloric acid as the mineral acid reactant, in which instance the by-product is sodium chloride. However, such systems are not as efficient as the systems employing sulfuric acid. Further, only sodium chloride is produced and in those instances where varying quantities of sodium sulfate are required, to generate the required amount of sodium sulfate would necessitate the switching back and forth from a catalyzed sulfuric acid system to a catalyzed hydrochloric acid system, with all the problems attendant thereto.

It is an object of the present invention to provide a process wherein the single vessel process may be operated most efficiently to produce chlorine dioxide and the recovery of by-product salt regulated to produce the salt desired in quantities desired, without the necessity of changing conditions in the reactor.

It is a further object of the present invention to provide an improved process for treatment of the crystal slurry produced in single vessel reactors to return chlorate and sulfate values contained in the solids containing effluent to the generator for further reaction, to remove sodium by converting the sodium values to a desirable salt or acid salt, as required and to add chloride and/or acid values for recycle to the generator.

In accordance with the process of the present invention, single vessel process slurry, containing alkali metal sulfate crystals and chlorate values, is introduced into the top of one or more metathesis columns. The alkali metal sulfate may be converted to a more desirable salt by reaction with a metathesis solution such as an acid such as HCl or oxalic acid to produce a salt slurry together with sulfuric acid or its acid sulfates. To produce the necessary salt slurry, the acid utilized must be sufficiently dissociated in solution that the solubility in that solution of the alkali metal salt is exceeded.

For example, aqueous hydrochloric acid having a concentration of from about 10 to about 37 percent by weight is added continuously or intermittently via an inlet near the bottom of the metathesis column in countercurrent flow to the downward flow of the slurry, with the crystals contained in the slurry reacting with hydrochloric acid to produce sodium chloride, sulfuric acid and the acid sulfates, the regenerated sulfuric acid utilizing the acid sulfates and the chlorate values are washed up the column to the generator, and the sodium chloride may be removed as an aqueous slurry via an outlet located near the bottom of the metathesis column.

The use of such process has many advantages. The process permits of the employment of the more highly efficient sulfuric acid reaction in the single vessel generator-evaporator-crystallizer without changing to the less efficient hydrochloric acid reaction process, in those instances where reduced quantities of by-product sodium sulfate are required. In those instances where sodium sulfate is desired in increased or maximum quantities the process permits of such increase or maximizing by simply reducing or periodically replacing the flow of hydrochloric acid into the bottom of the metathesis column by a flow of wash water. In such instances where maximum production of sodium sulfate is to be realized, the upward flowing wash water functions to return essentially all chloride, chlorate and sulfuric acid values continuously to the generator, requiring a relatively low energy input into the system. Additionally, under these conditions, and where the generator is operated under high acid concentrations, on the order of about 10-11 normal, the water wash allows for the recovery of the sodium sulfate as neutral sodium sulfate as opposed to the undesirable acid sodium sulfates recovered by slurry filtration techniques employed in the past art.

The rates at which the hydrochloric acid or water are fed into the bottom of the metathesis column are, of course, dependent upon the desired conversion or washing to be effected. In those instances where total conversion of sodium sulfate to sodium chloride is to be effected, the amount of hydrochloric acid fed continuously into the metathesis column will be at least twice that of the sodium sulfate being produced in the reactor, on a molar basis. In those instances where the sodium sulfate to be removed is to be reduced by pre-determined amounts, the flow adjustment of hydrochloric acid into the metathesis column is made to effectively permit of the desired amount of conversion, with the unconverted sodium sulfate recovered from the bottom of the column. Similarly, oxalic acid provides a sodium oxalate slurry which is subject to the aforesaid description.

Alternately and concurrently, chloride values may be supplied to the generator by utilizing an aqueous solution of an alkali metal or alkali earth metal chloride in the metathesis column. For example, potassium chloride may be utilized wherein a potassium sulfate slurry and sodium chloride solution is formed. The sodium chloride will be washed to the generator and a potassium sulfate slurry recovered. Similarly, recovery of sulfates of the other alkali earth metals or alkali metals may be effected with input of chloride to the generator.

It should be understood however if an acid and an alkali metal or alkali earth metal salt or mixture thereof are used concurrently, a mixed salt slurry will be created which may provide further problems in separation. Such may be avoided by utilizing multiple metathesis and/or separatory columns on a single generator either in parallel or cascaded to gain purer products.

The slurry taken from the metathesis column may be washed by elutriation in a separate, separator column or elutriated by integration in the bottom of the metathesis column in which instance the metathesis solution intake would be toward the middle of the column.

The size of the metathesis and separatory column may be on the order of 6-24 inches in diameter and 10-15 feet or longer, dependent primarily on the size of the generator employed.

BRIEF DESCRIPTION OF THE DRAWINGS

FIGS. 1, 2 and 3 are schematic vertical elevations.

DETAILED DESCRIPTION

Figure 1:
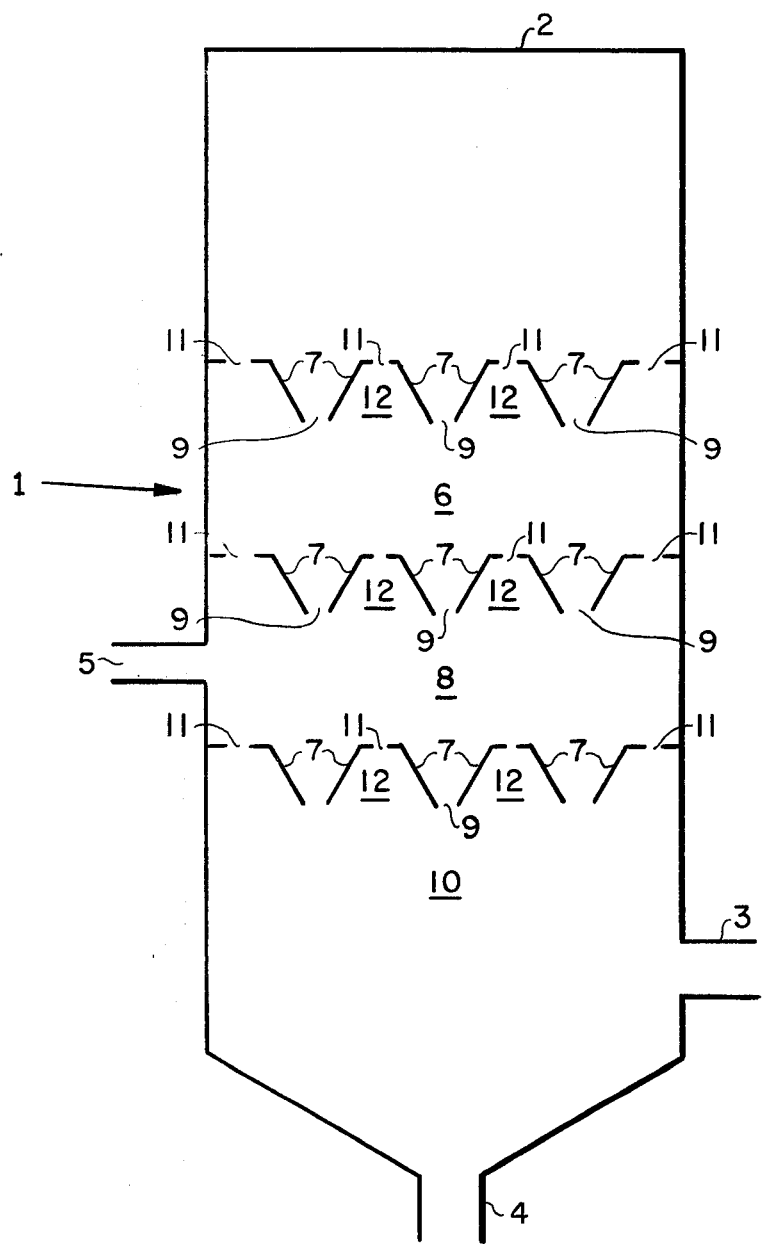
FIGS. 1, 2 and 3 are illustrative of metathesis and separatory columns which are advantageously employed in the process of the present invention.

FIG. 1 is illustrative of a combined metathesis and elutriation column which is advantageously employed in the process of the present invention. The apparatus is a column or tower 1 made of any suitable construction materials, such as for example, titanium, plastics, ceramics, or the like. The column is preferably, although not necessarily, substantially cylindrical having an inlet means 2 at the upper portion thereof for the introduction of crystal slurry from the single vessel reactor (not shown). The middle portion of the column is provided with a metathesis solution inlet 5. The lower portion of the column is provided with a hot water inlet 3 and a washed crystal takeoff means 4. Column 1 is divided into multiple treatment zones 6, 8, 10, etc. by plates incorporating at least one and preferably multiple downwardly tapering funnel-shaped configurations 7 having openings 9 at the apex for discharging slurry downward into turbulent metathesis zones 6 and 8 and washing zones 10 etc. the flow of slurry directed downwardly from plate to plate, and succeeding metathesis and washing zones.

Each plate is provided with multiple aperatures 11 located at or near the junction of the uppermost portion of the plate and the funnel shaped configuration. As the crystal containing slurry moves downward onto the plate and through the opening 9, the upcoming flow of metathesis solution is diverted in part through openings 11, setting up a circulatory flow around and in the funnel shaped configuration, creating turbulence in the zones immediately below the openings 9, causing the sodium sulfate to undergo metathesis reaction with the metathesis solution, the similar activity of the hot water in the lower section continuously freeing the salt from chlorate, chloride and sulfuric acid values and continuously permitting the downward passage of salt for removal via outlet 4 and passage to the generator. Control of the downward flow of the crystals and the extent of the turbulence is conveniently effected by adjusting the relative sizes of the openings 9 and 11.

Zone 12 of the apparatus is a relatively non-turbulent zone wherein the crystals settle by gravity and are not carried by rising liquid to the washing or metathesis zone above.

The column may be located immediately below the generator in which instance the crystal slurry moves by gravity flow from the generator (not shown) into the column via inlet 2. Chlorate, chloride and sulfuric acid values are continuously returned directly to the generator in that portion of the wash water directed by upward flow into the generator. In those instances where space and other factors dictate the placement of the column at a site adjacent to or remote from the generator, the crystal slurry is pumped by suitable pumping means (not shown) to the column via inlet 2.

The total number of plates situated in the column may be varied, depending generally upon the size of the generator, amounts of crystal slurry to be handled in a given time period, space considerations. Generally, in operations where standard generators are used with a capacity of about 6000 gallons, columns of about 10-15 feet in length, 2-3 feet in diameter having 8-12 plates situated approximately 1 foot apart are suitable.

Figure 2:
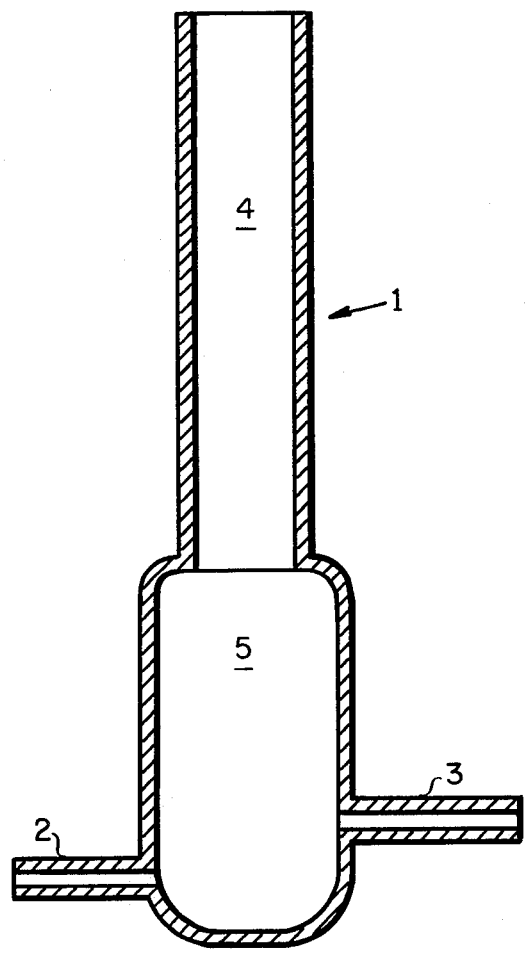

FIG. 2 represents a metathesis column useful in the process of the present invention. The column, as with the column of FIG. 1, may be situated either adjacent to or immediately below the single vessel generator. In those instances where the column is located immediately below the single vessel generator, crystal slurry is continuously moved from the bottom of the generator (not shown) to the top of the column 1 at zone 4. Metathesis solution is continuously admitted to the column via 2 and flows upwardly through the column, continuously reacting with the down flowing crystals, and continuously returning the chlorate, chloride and sulfuric acid values removed therefrom to the generator from the top of the column. The crystals move downward into a crystal collection zone 5 from whence they are removed via outlet 3. Outlet 3, shown as located at a point on the column 1 above the metathesis solution inlet 2 may be varied in position near the bottom of the column.

As with the column in FIG. 1, this column can also be situated adjacent the single vessel reactor, in which instance pumping means are provided to continuously feed the crystal slurry from the generator to the column, and the spent metathesis solution containing the removed chlorate, chloride and sulfuric acid values continuously removed from the top of the column and returned continuously to the generator via suitable pumping and inlet means.

Figure 3:
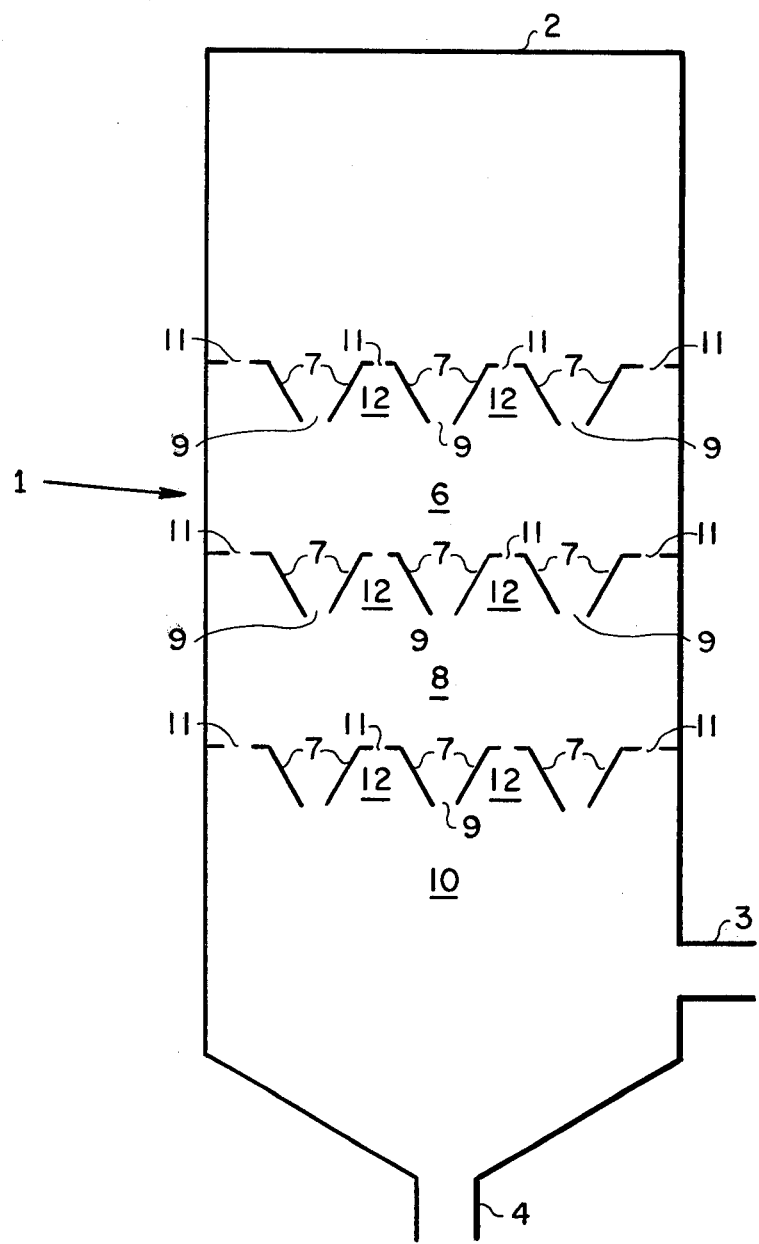

FIG. 3 is an embodiment of a metathesis column alone of FIG. 1, wherein elutriation is achieved by a separate vessel.

Though the process of the present invention is particularly suitable to a single vessel chlorine dioxide generating process but is not limited to such and may be readily adapted to a chlorine dioxide generating system wherein the spent generator slurry is crystallized in a separate vessel by providing transport of the recovered chlorate, chloride and sulfuric acid values to the generator.

Utilizing the process of the present invention, it was found that the amount of chlorate, chloride and sulfuric acid values remaining in the recovered sulfate were approximately 0.2 to about 0.25 that remained in the sulfate when attempting standard separatory techniques with filters. Additionally, utilizing the process of the present invention, where the single vessel generator is operated at high acid normalities, the undesirable acid sulfates produced are converted into neutral sodium sulfate during the washing, not possible when utilizing filter or centrifuge-type separatory procedures.

The rates of flow of the sodium sulfate slurry downward and the flow of metathesis solution upward are adjusted so as to provide maximum conversion efficiency without substantially increasing the steam requirements for the vacuum evaporation in the generator.

Generally, the washing and conversion reaction requires the adjustments of flow rates as to provide for a retention time of from about 10 to about 60 minutes, preferably from about 15 to about 40 minutes.

The following examples serve to illustrate the present invention.

EXAMPLE I

Utilizing the metathesis column shown in FIG. 1 having 11 ledges, the dilute hydrochloric acid inlet was located between the fifth and sixth ledges from the bottom with a water inlet located at the bottom of the column. The reaction producing chlorine dioxide in the single vessel generator was adjusted to produce sodium sulfate at the rate of 57.6 pounds per hour. Aqueous hydrochloric acid, as 36 percent acid, was fed into the metathesis column at the rate of 28 pounds per hour with 50 pounds per hour of hot water added to the bottom of the column to wash the sodium chloride produced in the metathesis column. Sulfuric acid, in the amount of 23.5 pounds per hour was recovered from the top of the column. Analysis of the salt slurry recovered from the bottom of the column indicated 28.06 pounds per hour recovery of sodium chloride, 43.82 pounds per hour takeoff of water 0.08 pound per hour hydrochloric acid and 0.02 pound per hour sodium sulfate, indicative of essentially complete conversion of the sodium sulfate to sodium chloride in the column.

EXAMPLE II

In a manner similar to Example I, aqueous potassium chloride is introduced into a metathesis column at an inlet located between ledges in the appropriate middle of the column. The reaction producing chlorine dioxide is adjusted to produce sodium sulfate at the rate of 71 pounds per hour. Aqueous potassium chloride, a 30% solution, is fed into the metathesis column at the rate of 250 pounds per hour with 200 pounds per hour of hot water added to the bottom of the column to wash the potassium sulfate produced in the metathesis column. Sodium chloride, in the amount of 58 pounds per hour is recovered for the top of the column.

What is claimed is:

1. In a process for continuously generating a mixture containing chlorine dioxide, chlorine and sulfate wherein
   a. an alkali metal chlorate, a chloride and a mineral acid selected from sulfuric acid and mixtures of sulfuric acid with phosphoric and hydrochloric acid are continuously reacted in proportion to generate chlorine dioxide and chlorine;
   b. the temperature is maintained within a range of from about 50° to about 100° centigrade;
   c. the acidity of the reaction solution is maintained within the range of about 2 to about 12 normal;
   d. chlorine dioxide and chlorine produced by said reaction is withdrawn from the reactor;
   e. water is removed and alkali metal salt of said mineral acid is crystallized in the form of an aqueous slurry containing minor amounts of chlorate, chloride and acid values;

The improvement which comprises:

continuously passing the slurry containing crystals of the alkali metal salt of the mineral acid and chlorate values into the top of a metathesis column, in a downward flow;

countercurrently passing a stream of aqueous metathesis solution upward through said column at a rate and in amounts sufficient to effect reaction of said solution with said alkali metal salt crystals converting said alkali metal salt crystals to the salts of the metathesis solution whereby chlorate, chloride and acid values recovered therefrom are continuously and substantially returned to the reaction of (a) aforesaid.

2. The process of claim 1 wherein said aqueous metathesis solution is an aqueous acid solution and said acid is selected from hydrochloric and oxalic acid.

3. The process of claim 2 wherein said metathesis solution is an aqueous hydrochloric acid solution.

4. The process of claim 3 wherein said aqueous hydrochloric acid solution has a concentration of from about 32 to about 37 percent by weight.

5. The process of claim 3 wherein the aqueous hydrochloric acid solution is produced by introducing hydrogen chloride gas into the metathesis column.

6. The process of claim 1 wherein said metathesis solution is an aqueous solution wherein the solute is selected from alkali metal chlorides and alkali earth metal chlorides.

7. The process of claim 6 wherein said solution is potassium chloride.

8. The process of claim 1 wherein said metathesis alkali earth metal and alkali metal salts are thereafter elutriated with water in a separator column.

9. The process of claim 8 wherein the metathesis and separator columns are a single unit apparatus.

10. The process as defined in claim 8 wherein water is continuously introduced into said metathesis column at the bottom thereof to effect washing of the metathesis salts.

11. The process of claim 8 wherein the metathesis and separator column are separate apparatus.

12. In a process for continuously generating a mixture containing chlorine dioxide, chlorine and sulfate wherein a. an alkali metal chlorate, a chloride and a mineral acid selected from sulfuric acid and mixtures of sulfuric acid and a member of the group consisting of hydrochloric acid and phosphoric acid are continuously reacted in a single vessel generator-evaporator-crystallizer in proportions to generate chlorine dioxide and chorine;

b. the temperature is maintained within a range of from about 50° to about 100° centrigrade;

c. the acidity of the reaction solution is maintained within the range of from about 2 to about 5 normal;

d. the reaction solution is subjected to a vacuum of from about 100 to about 400 millimeters of mercury absolute to effect evaporation of water vapor;

e. chlorine dioxide and chlorine produced by said reaction is withdrawn in admixture with said water vapor, and the reaction is conducted in the presence of at least one catalyst selected from the group consisting of vanadium pentoxide silver ions, manganese ions, dichromate ions and arsenic ions, and f. neutral alkali metal salt is crystallized within said single vessel generator-evaporator-crystallizer and withdrawn therefrom;

the improvement which comprises continuously passing the slurry containing neutral alkali metal salt crystals and chlorate values produced in said single vessel generator-evaporator-crystallizer into the top of a metathesis column, in a downward flow;

countercurrently passing a stream of aqueous metathesis solution upwardly through said column at a rate and in amounts sufficient to effect reaction of said solution with said alkali metal salt, converting said alkali metal salt to the salts of the metathesis solution, continuously returning chlorate, chloride and acid values substantially completely to said single vessel generator-evaporator-crystallizer; and continuously removing the salts of the metathesis solution slurry from the bottom of said metathesis column.

13. The process as defined by claim 12 wherein the alkali metal chlorate is sodium chlorate and the chloride is sodium chloride.

14. The process of claim 12 wherein the aqueous metathesis solution is an aqueous acid solution and said acid is selected from hydrochloric and oxalic acid.

15. The process of claim 14 wherein said metathesis solution is an aqueous hydrochloric acid solution.

16. The process as defined by claim 15 wherein the aqueous hydrochloric acid has a concentration of from about 32 to about 37 percent by weight.

17. The process as defined by claim 15 wherein the temperature of the aqueous hydrochloric acid is above about 20° to about 35° centigrade.

18. The process of claim 15 wherein the aqueous hydrochloric acid solution is produced by introducing hydrogen chlorine gas into the metathesis column.

19. The process of claim 12 wherein said metathesis solution is an aqueous solution wherein the solute is selected from alkali metal chlorides and alkali earth metal chlorides.

20. The process of claim 19 wherein said solute is potassium chloride.

21. The process of claim 12 wherein said the salts of the metathesis solution are thereafter elutriated with water in a separator column.

22. The process of claim 21 wherein the metathesis and separatory columns are a single unit apparatus.

23. The process as defined by claim 22 wherein water is continuously introduced into said metathesis column at the bottom thereof to effect washing of the metathesis salts.

24. The process of claim 21 wherein the metathesis and separator columns are separate apparatus.

* * * * *